United States Patent

Döme

[15] 3,659,165
[45] Apr. 25, 1972

[54] VARIABLE CAPACITOR

[72] Inventor: Peter Döme, Athenaz, Geneva, Switzerland

[73] Assignee: Societe Suisse Pour L'Industrie Hologere S.A., Geneva, Switzerland

[22] Filed: Sept. 11, 1970

[21] Appl. No.: 71,504

[30] Foreign Application Priority Data

Sept. 12, 1969 Switzerland ..................13765/69

[52] U.S. Cl. .................................317/249 D, 317/249 R
[51] Int. Cl. ..................................................H01c 5/06
[58] Field of Search .......................317/246, 249 R, 249 D

[56] References Cited

UNITED STATES PATENTS

| | | |
|---|---|---|
| 2,639,388 | 5/1953 | Matare...............................317/249 R |
| 2,751,530 | 6/1956 | Armstrong..........................317/246 |
| 2,755,419 | 7/1956 | Hollmann...........................317/249 R |
| 3,304,472 | 2/1967 | Sperry................................317/249 R |

*Primary Examiner*—E. A. Goldberg
*Attorney*—Karl F. Ross

[57] ABSTRACT

The capacitor comprises a metallic lower cup whose rim forms an annular seat for a glass plate held in position by an inverted metallic upper cup defining with the lower cup a conductive enclosure. The glass plate carries an eccentrically positioned metallic layer, spaced from the surrounding enclosure, which constitutes a first condenser plate and confronts with small clearance a conductive boss integrally depending from the upper cup and constituting the second condenser plate. Relative rotation of the two cups, via a pinion meshing with peripheral teeth of the upper cup, enables adjustment of the capacitance defined by the layer and the boss.

8 Claims, 10 Drawing Figures

Patented April 25, 1972

Peter Döme
Inventor.

By Karl G. Ross
Attorney

Patented April 25, 1972

Peter Döme
INVENTOR.

BY

Karl J. Ross
Attorney

VARIABLE CAPACITOR

My present invention relates to a variable capacitor which can be used, for instance, as a trimmer condenser for an electric clockwork, e.g. in wristwatches, to regulate the operating frequency of the movement as determined by a crystal-controlled oscillator whose output frequency is stepped down by frequency division to a suitable value.

It is known to connect such a trimmer condenser across a piezoelectric crystal as a shunt capacitor and to enclose this condenser in a conductive housing to isolate it from stray capacitances. Prior constructions of this character, however, were relatively complex and bulky, entailing considerable losses of energy due to capacitive leakage along their relatively elongated leads with consequent dissipation of energy detrimental to long-term operation by a small battery.

The general object of my invention, therefore, is to provide a compact, simple and well-shielded condenser of this type closely juxtaposed with the associated piezoelectric crystal.

A more specific object is to provide convenient and readily accessible means for adjusting the capacitance of such a condenser within a relatively broad range.

These objects are realized, pursuant to my present invention, by the provision of a conductive enclosure split into two substantially complementary halves, i.e. a first half (referred to hereinafter, for convenience, as the lower half) and a second half (hereinafter referred to as the upper half) in peripheral engagement with the first half and clamping a dielectric carrier plate therebetween. This peripherally clamped carrier plate, e.g. a glass disk, is provided on a surface thereof — preferably the one facing the upper half — with a conductive layer which is spaced from the conductive enclosure and which constitutes the first condenser plate. A conductive internal boss on the upper half confronts this layer with small clearance so as to constitute the second plate and to define therewith a condenser whose capacitance can be altered by relative rotation of the two halves, both the layer and the boss being eccentrically positioned for this purpose with reference to the axis of relative rotation.

The other surface of the carrier plate, i.e. its underside with the specific orientation here assumed, may be provided with a conductive coating similar to the aforementioned layer and registering therewith at least in part, this coating being in galvanic contact with the enclosure so as to define in effect a grounded further condenser plate connected in parallel with the plate constituted by the boss depending from the upper half of the enclosure. This increases the effective capacitance and affords the possibility of extending and/or modifying the range of adjustment.

In an advantageous embodiment, the lower half has a peripheral recess forming a seat for the dielectric plate, the rim of the upper half being received within this recess to urge the plate thereagainst. The two halves are releasably gripped from without, e.g. with the aid of a pair of screws, and can be relatively rotated only upon the release of the gripping means. When thus unclamped, the upper half may be rotated in small increments for fine adjustment of the capacitance. The means for carrying out such vernier adjustment may include a pinion of relatively small diameter in mesh with a set of peripheral teeth on the upper half of the enclosure, the pinion itself being rotatably journaled in the fixed lower half.

The above and other features of my invention will be described hereinafter in greater detail with reference to the accompanying drawing in which.

Figure 10:
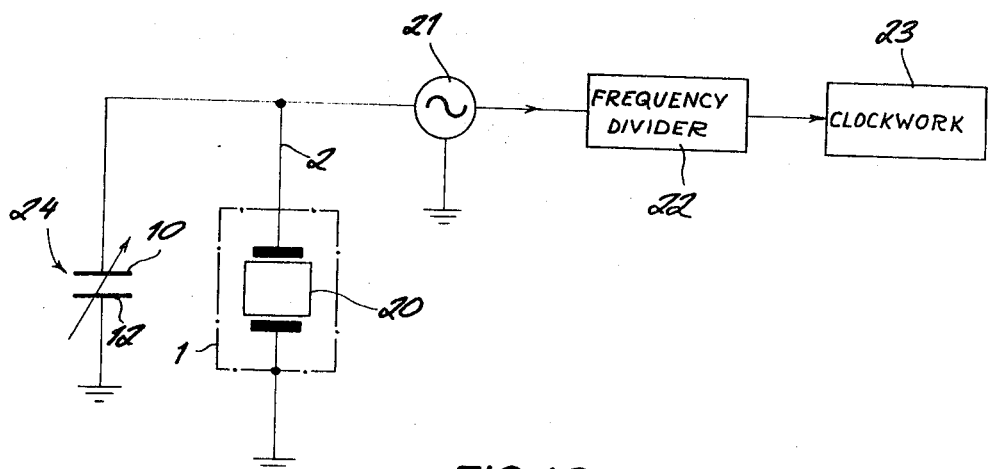
FIG. 10 is a diagrammatic view of a control system for a clockwork embodying a capacitor as illustrated in the preceding Figures.

Reference will first be made to FIG. 10 illustrating a piezoelectric crystal 20 disposed within a metallic housing 1 which is connected to the lower, grounded terminal of the crystal. The upper crystal terminal 2 emerges insulatedly from the housing and is connected to an input of a high-frequency oscillator 21 whose tank circuit includes the crystal 20 as an impedance. The output frequency of oscillator 21 is stepped down by a frequency divider 22 to a value suitable for driving a conventional clockwork 23. An adjustable trimmer condenser 24, shunted across crystal 20, has an ungrounded upper plate 10 connected to the live lead 2 of the crystal, its lower plate 12 being grounded.

Details of the construction of condenser 24 and its mounting on crystal housing 1 will now be described with reference to FIGS. 1 - 9.

Housing 1 is generally cylindrical and carries on its top a metallic enclosure consisting of a cup-shaped lower half 3 and a complementary upper half 4 of inverted-cup shape. Cup 3, soldered to housing 1 by a peripheral seam 5, has two integral lugs 3b and 3c extending in diametrically opposite directions. These lugs are provided with threaded bores 3d', 3d'' respectively accommodating a pair of screws 6a, 6b whose enlarged heads bear from above upon a toothed peripheral flange 13 of cup 4 to clamp the latter in position. Lug 3b is further provided with an unthreaded bore 3e receiving a reduced end 15 of a stem 14 which is formed with gear teeth 16 in mesh with the toothed flange 13 to act as a driving pinion therefor, the stem 14 terminating at its upper end in a milled or slotted head (not shown) for manual rotation directly with the fingers or by means of a screwdriver. Such rotation, upon a loosening of the screws 6a and 6b, entrains the cup 4 so as to turn it with reference to cup 3 about their common axis indicated at 0 in FIG. 1.

Cup 3, which has a peripheral cutout 3a for the passage of a wire 11 soldered at 2a to the ungrounded lead 2 of the associated crystal, has an inner peripheral rabbet 8 forming a seat for a glass plate 9 in the shape of a circular disk. The rabbet 8 is bounded by a peripheral wall 7 receiving with sliding fit the rim 4a of the upper cup 4, this rim bearing from above upon the plate 9 to lock it in place when the cup 4 itself is gripped by the clamping screws 6a and 6b. A diametrical slot 4b in the upper surface of enclosure member 4 facilitates its direct rotation, by a screwdriver or the like, for coarse adjustment of its position relative to member 3.

Figure 6:
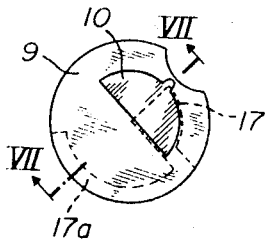
FIG. 6 is a top plan view, drawn to the scale of FIG. 1, of a carrier plate and conductive layer seen in FIGS. 2 - 4.
Figure 8:
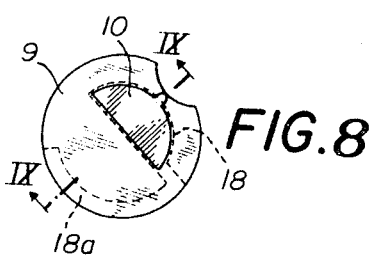
FIG. 8 is a view similar to FIG. 6, showing a modification.
Figure 7:
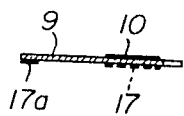
FIG. 7 is a cross-sectional view taken on the line VII — VII of FIG. 6.
Figure 9:
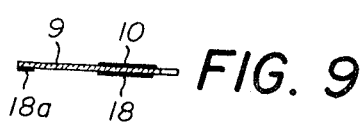
FIG. 9 is a cross-sectional view taken on the line IX — IX of FIG. 8.

Plate 9 carries a thin layer 10 of conductive material, such as a metallic coating applied to it by spraying, plating, vapor deposition or other conventional techniques, which is conductively connected at 10a to wire 11 and is of generally semicircular shape (see FIGS. 3, 6 and 8) bounded by a diametrical line passing through axis 0. The radius of this layer is substantially less than that of disk-shaped plate 9 so that its arcuate boundery is separated by a uniform distance from the metallic enclosure 3, 4. Plate 9 is peripherally recessed at 9a to give clearance to the wire 11 which, of course, must be suitably insulated against contact with the grounded enclosure 3, 4. Layer 10 confronts, with small clearance, a boss 12 integrally depending from the upper enclosure member 4, the two air-spaced surfaces of the layer and the boss thus constituting the similarly designated condenser plates of FIG. 10. The outline of boss 12 is substantially identical with that of layer 10, see FIG. 4, so that the two surfaces are in full registry in their position of alignment illustrated in FIG. 2. Since both elements 10 and 12 are eccentrically disposed with reference to the axis of rotation 0, any rotary movement of member 4 with reference to member 3 will alter the capacitance therebetween. This capacitance can be further modified by the addition of a coating 17 on the underside of carrier plate 9, as illustrated in FIGS. 6 and 7. Coating 17 has a narrow strip 17a extending therefrom to the periphery of disk 9 for conductive contact with the rabbeted peripheral wall of cup 3, the coating being thereby grounded and effectively connected in parallel with boss 12. Coating 17 forms a sector (here specifically a quadrant) registering only partly with layer 10. In FIGS. 8 and 9, on the other hand, I have shown a similar coating 18 (with connecting strip 18a) coextensive with foil 10, and therefore also with boss 12 in their position of maximum capacitance.

It may be mentioned, by way of example, that the condenser 24 thus described can be built with a diameter on the order of 5 mm and a height of 1.5 mm, such a condenser having a capacitance of approximately 0.7 pF variable by ± 0.2 pF in an operative range of manual adjustment. With the addition of a supplemental coating 17 as shown in FIGS. 6 and 7, this capacitance may be raised to the magnitude of about $1.2 \pm 0.2$ pF; the larger coating 18 of FIGS. 8 and 9 further increases this capacitance to substantially $1.7 \pm 0.2$ pF.

If desired, the carrier plate 9 may be fixedly cemented on its seat 7 so as to provide an invariable reference position of maximum capacitance. Naturally, the initial or mean position should be offset from this reference position in order to allow adjustment upward as well as downward.

Figure 5:
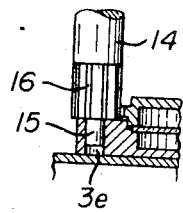
FIG. 5 is a sectional detail view taken on the line V — V of FIG. 1.
Figure 1:
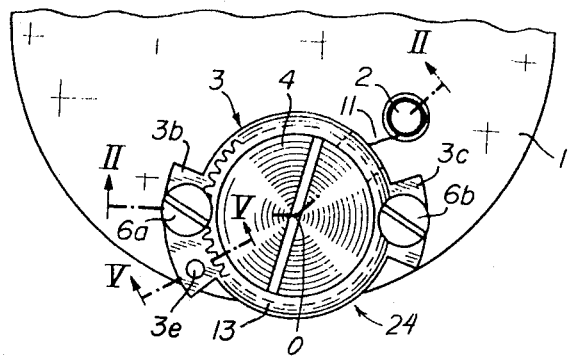
FIG. 1 is a top plan view of a trimmer condenser according to the present invention.
Figure 2:
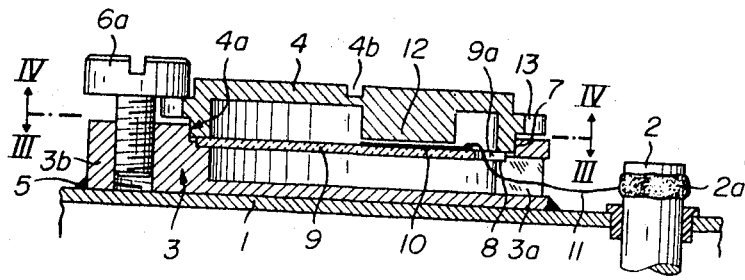
FIG. 2 is an enlarged cross-sectional view taken on the line II — II of FIG. 1.
Figure 3:
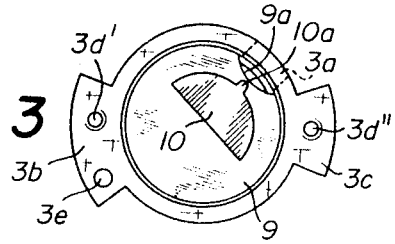
FIGS. 3 and 4 are sectional views drawn to the scale of FIG. 1 and taken on lines III — III and IV — IV, respectively, of FIG. 2.
Figure 4:
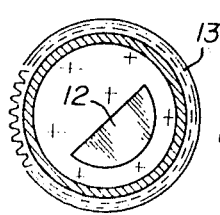

The driving pinion 14 – 16, shown in FIG. 5 to be removably positioned in the extension 3b of cup 3, may also be permanently secure thereto by suitable means not shown.

I claim:

1. A variable capacitor comprising:
    a conductive enclosure divided into two substantially complementary conductive halves including a first half and a second half peripherally engaging said first half, said halves being relatively rotatable about a common axis;
    a dielectric carrier plate interposed between said halves, said first half having a peripheral recess forming a seat for said plate, said second half having a rim received within said recess and urging said plate thereagainst;
    a conductive layer on a part of one face of said plate spaced from said enclosure, said layer constituting a first condenser plate, said second half being provided with a conductive internal boss constituting a second condenser plate and confronting said layer with small clearance, said boss and said layer being eccentrically positioned with reference to said axis whereby relative rotation of said halves alters the capacitance thereof; and
    gripping means on said enclosure releasably securing said second half to said first half in a selected angular position.

2. A variable capacitor as defined in claim 1 wherein said layer is provided on the side of said plate facing said second half.

3. A variable capacitor as defined in claim 2 wherein said plate is provided, on its side opposite said layer, with a conductive coating registering at least in part with said layer, said coating being conductively connected to said enclosure.

4. A variable capacitor as defined in claim 1 wherein said first half is provided with a peripheral cutout, further comprising a lead conductively joined to said layer and passing outwardly through said cutout.

5. A variable capacitor as defined in claim 1, further comprising positioning means effective upon release of said gripping means for rotating said second half about said axis.

6. A variable capacitor as defined in claim 5, wherein said positioning means includes a set of peripheral teeth on said second half and a pinion in mesh with said teeth journaled in a peripheral projection of said first half.

7. A variable capacitor as defined in claim 1 wherein said first half is upwardly open and overlain by said second half.

8. A variable capacitor as defined in claim 1 wherein said layer and said boss are of substantially semicircular shape bounded by diametrical lines through said axis.

* * * * *